United States Patent
Gupta et al.

(10) Patent No.: US 12,493,474 B2
(45) Date of Patent: Dec. 9, 2025

(54) APPLICATION PERFORMANCE ON A CONTAINERIZED APPLICATION MANAGEMENT SYSTEM CLUSTER

(71) Applicant: Dell Products L.P., Round Rock, TX (US)

(72) Inventors: Vinod Gupta, Shrewsbury, MA (US); Eddie Pavkovic, Westford, MA (US); Benjamin Schumacher, Loretto, MN (US)

(73) Assignee: DELL PRODUCTS L.P., Round Rock, TX (US)

( * ) Notice: Subject to any disclaimer, the term of this patent is extended or adjusted under 35 U.S.C. 154(b) by 69 days.

(21) Appl. No.: 18/150,357

(22) Filed: Jan. 5, 2023

(65) Prior Publication Data

US 2024/0231843 A1 Jul. 11, 2024

(51) Int. Cl.
*G06F 9/445* (2018.01)
*G06F 9/38* (2018.01)

(52) U.S. Cl.
CPC ........ *G06F 9/44505* (2013.01); *G06F 9/3836* (2013.01)

(58) Field of Classification Search
CPC .......................... G06F 9/44505; G06F 9/3836
See application file for complete search history.

(56) References Cited

U.S. PATENT DOCUMENTS

| | | | | |
|---|---|---|---|---|
| 7,200,779 | B1* | 4/2007 | Coss, Jr. | G06F 11/0781 714/48 |
| 8,984,512 | B2* | 3/2015 | Sheehan | G06F 9/44505 718/1 |
| 9,576,271 | B2* | 2/2017 | Feng | G06F 3/0484 |
| 9,836,342 | B1* | 12/2017 | Mahapatra | G06F 11/202 |
| 10,423,459 | B1* | 9/2019 | Jacques de Kadt | G06F 9/5061 |
| 10,958,654 | B1* | 3/2021 | Relan | H04L 63/10 |
| 11,722,456 | B2* | 8/2023 | Kesavan | H04L 61/4535 709/245 |
| 11,853,330 | B1* | 12/2023 | Bannon | G06F 3/0482 |
| 2005/0204009 | A1* | 9/2005 | Hazarika | G06Q 10/107 709/206 |
| 2007/0050471 | A1* | 3/2007 | Patel | G06F 9/54 709/217 |

(Continued)

*Primary Examiner* — Faisal M Zaman
(74) *Attorney, Agent, or Firm* — Amin, Turocy & Watson, LLP

(57) ABSTRACT

The described technology is generally directed towards monitoring the operational health of one or more applications deployed on a containerized application management system (CAMS) cluster. Various application resources can be mapped to one or more applications, in conjunction with various events and filters. Events can be monitored and reviewed to determine which application resource(s) is associated with the event, and further, the event's effect on the application(s). The events can be filtered based upon the effect on the operational health of the application. For example, if an event is identified as insignificant, the event does not have to be reported. In another example, if the event is identified as being potentially critical to the operational health of the application, a notification can be generated informing an operator that an application may have experienced potentially catastrophic damage. Based thereon, the administrator can then undertake an action(s) necessary to mitigate the damage.

20 Claims, 11 Drawing Sheets

| HEALTH ISSUES 310A-n | EVENTS 185A-n | | | | REPORT Y/N? 390 | PHYSICAL RESOURCES 360A-n | CURRENT STATUS 380A-n |
|---|---|---|---|---|---|---|---|
| | ID | SEVERITY 330A-n | MESSAGE 340A-n | REASON 350A-n | | | |
| DISK ISSUE 310A | E1 (185A) | WARNING 330A | DISK FAILURE IS SUSPECTED 340A | DISKSUSPECT 350A | N | DISK 1 360A | NORMAL 380A |
| | E2 (185B) | ERROR 330B | DISK IS FAILED 340B | DISKFAILED 350B | Y | | |
| | E3 (185C) | NORMAL 330C | DISK IS REPLACED 340C | DISKREPLACEMENT 350C | Y | | |
| | E4 (185D) | NORMAL 330D | DISK OPERATIONAL 340D | NORMALFUNCTION 350D | Y | | |
| ISSUE 2 310B | EVENTS 185R-n | | | | | RESOURCE 360B | CURRENT STATUS 380B |
| ISSUE 3 310n | EVENTS 185X-n | | | | | RESOURCE 360n | CURRENT STATUS 380n |

(56) References Cited

U.S. PATENT DOCUMENTS

| | | | | |
|---|---|---|---|---|
| 2007/0266160 | A1* | 11/2007 | Johnson | G06F 16/951 |
| | | | | 707/E17.108 |
| 2008/0163258 | A1* | 7/2008 | Balasubramanian | |
| | | | | G05B 23/0267 |
| | | | | 719/318 |
| 2009/0254775 | A1* | 10/2009 | Coffey | H04L 69/40 |
| | | | | 714/E11.071 |
| 2011/0289506 | A1* | 11/2011 | Trivi | G06F 9/526 |
| | | | | 718/104 |
| 2012/0011035 | A1* | 1/2012 | Calcaterra | G06F 11/0709 |
| | | | | 714/57 |
| 2012/0042078 | A1* | 2/2012 | Kroeger | H04L 67/02 |
| | | | | 709/226 |
| 2013/0111078 | A1* | 5/2013 | Yamauchi | G06F 13/30 |
| | | | | 710/23 |
| 2014/0137131 | A1* | 5/2014 | Dheap | G06F 9/5005 |
| | | | | 718/104 |
| 2014/0201678 | A1* | 7/2014 | Shen | G06F 3/0481 |
| | | | | 715/788 |
| 2014/0304700 | A1* | 10/2014 | Kim | G06F 8/65 |
| | | | | 717/173 |
| 2015/0281144 | A1* | 10/2015 | Staerk | H04L 51/046 |
| | | | | 715/752 |
| 2016/0092266 | A1* | 3/2016 | Bavishi | G06F 9/5016 |
| | | | | 718/1 |
| 2016/0374104 | A1* | 12/2016 | Watfa | H04W 12/04 |
| 2017/0293404 | A1* | 10/2017 | Boodhoo | G06F 8/38 |
| 2018/0159954 | A1* | 6/2018 | Lu | H04L 67/61 |
| 2018/0288170 | A1* | 10/2018 | Yin | H04L 67/51 |
| 2019/0097825 | A1* | 3/2019 | Kan | G06F 16/951 |
| 2019/0098089 | A1* | 3/2019 | Shim | H04L 67/565 |
| 2019/0199788 | A1* | 6/2019 | Cadeau | H04L 67/1034 |
| 2020/0097347 | A1* | 3/2020 | Mahindru | G06F 11/076 |
| 2020/0211546 | A1* | 7/2020 | Schairer | G10L 15/08 |
| 2020/0272514 | A1* | 8/2020 | Hayashi | G06Q 10/107 |
| 2020/0285222 | A1* | 9/2020 | Rogenmoser | G05B 19/41875 |
| 2020/0358650 | A1* | 11/2020 | Iyengar | H04L 41/0677 |
| 2021/0337039 | A1* | 10/2021 | Dukellis | H04L 67/55 |
| 2022/0114003 | A1* | 4/2022 | Okman | G06F 9/45558 |
| 2022/0179702 | A1* | 6/2022 | Dawkins | G06F 11/3433 |
| 2022/0283862 | A1* | 9/2022 | Narayana Gowda | |
| | | | | G06F 9/4806 |
| 2022/0292008 | A1* | 9/2022 | Kavali | G06F 11/0772 |
| 2023/0038294 | A1* | 2/2023 | Lenhard | G06F 16/273 |
| 2024/0028321 | A1* | 1/2024 | Sethi | H04L 41/046 |
| 2024/0028323 | A1* | 1/2024 | Gopireddy | G06F 8/65 |
| 2024/0160517 | A1* | 5/2024 | Fischer | G06F 11/0769 |
| 2024/0362069 | A1* | 10/2024 | Zeng | G06F 9/4843 |

\* cited by examiner

| HEALTH ISSUES 310A-n | EVENTS 185A-n | | | | | PHYSICAL RESOURCES 360A-n | CURRENT STATUS 380A-n |
|---|---|---|---|---|---|---|---|
| | ID | SEVERITY 330A-n | MESSAGE 340A-n | REASON 350A-n | REPORT Y/N? 390 | | |
| DISK ISSUE 310A | E1 (185A) | WARNING 330A | DISK FAILURE IS SUSPECTED 340A | DISKSUSPECT 350A | N | DISK 1 360A | NORMAL 380A |
| | E2 (185B) | ERROR 330B | DISK IS FAILED 340B | DISKFAILED 350B | Y | | |
| | E3 (185C) | NORMAL 330C | DISK IS REPLACED 340C | DISKREPLACEMENT 350C | Y | | |
| | E4 (185D) | NORMAL 330D | DISK OPERATIONAL 340D | NORMALFUNCTION 350D | Y | | |
| ISSUE 2 310B | EVENTS 185R-n | | | | | RESOURCE 360B | CURRENT STATUS 380B |
| ISSUE 3 310n | EVENTS 185X-n | | | | | RESOURCE 360n | CURRENT STATUS 380n |

FIG. 3

APPLICATION PERFORMANCE ON A CONTAINERIZED APPLICATION MANAGEMENT SYSTEM CLUSTER

BACKGROUND

A recent approach to software application programming comprises building an application from a collection of containers (microservices) all working together, wherein each of the containers performs a particular function. Containers are combined to form a platform comprising physical or virtual hosts (servers). Hosts have containerized workloads operating thereon, with the hosts providing the workloads with the necessary computation, storage, and network resources required for a workload to execute and interact with other workloads operating across the platform. Operation of the platform of workloads is managed by a control plane, e.g., to upscale and downscale resources in response to the overall needs of the application. Such a containerized approach can be referred to as a containerized application management system (CAMS).

A CAMS can be a portable, extensible, open-source platform for managing containerized workloads and services, that facilitates both declarative configuration and automation. CAMS's are a large, rapidly growing ecosystem, with services, support, and tools being widely available. A CAMS cluster can include a variety of nodes, pods, etc., which can be utilized to deploy an application.

An application is a computer software package that performs a specific function for a customer (e.g., client, an end user, customer) or another application based on carefully designed features. One or more applications such as database system, web-application(s), caching application(s), and the like, can be deployed on a CAMS cluster. During deployment of an application, various resources can be configured, such as Deployment, ReplicaSets, StatefulSets, etc.

The number of nodes, pods, etc., utilized by an application can increase or decrease as a function of the operational needs of the application scaling up or down. Many solutions are available to monitor the operational health and performance of a CAMS cluster and generate a report regarding an operating condition of the CAMS cluster and the utilized nodes, pods, etc.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, methods, apparatus and/or computer program products are presented to facilitate identification of an operating condition of an application deployed on an infrastructure of a containerized application management system (CAMS). The operating condition of the application is a function of an operating condition of a resource included in the CAMS infrastructure. The resource can be mapped to the application, such that as the operating condition of the resource changes, the effect on the operational health of the application can be determined and, if required, a notification of the operational health of the application can be generated.

According to one or more embodiments, a system can be utilized, wherein the system comprises at least one processor, and a memory coupled to the at least one processor and having instructions stored thereon, wherein, when executed by the at least one processor, the instructions facilitate performance of operations, comprising determining a change in a first operating condition of a resource, wherein the resource is included in a deployment of a CAMS, and wherein an application is executing via the CAMS. In a further embodiment, the operations can further comprise identifying that the resource is being utilized by the application. In another embodiment, the operations can further comprise determining that the resource being utilized by the application has an effect on a second operating condition of the application. In a further embodiment, the operations can further comprise in response to the effect on the operating condition of the application, applying a filter to determine whether to generate a notification identifying the second operating condition of the application. In a further embodiment, the operations can further comprise, in response to determining that the second operating condition of the application has been deleteriously affected by the first operating condition of the resource, generating the notification indicating that the second operating condition of the application has been affected by the first operating condition of the resource. In another embodiment, the operations can comprise, in response to determining that the second operating condition of the application has not been affected by the first operating condition of the resource, generating the notification indicating that the second operating condition of the application is acceptable. In an embodiment, the CAMS comprises at least one of a node or a pod. In a further embodiment, the operations can further comprise, in identifying that the resource is being utilized by the application, mapping the resource to the application to facilitate the identifying that the resource is being utilized by the application executing via the CAMS. In another embodiment, the operations can further comprise compiling an operational history for the application, wherein the operational history comprises a collection of operating conditions applicable to the resource and respective effects of the operating conditions of the collection on the operating condition of the application. In another embodiment, the operations can further comprise analyzing the operational history to identify a pattern of effect of at least one operating condition, of the collection of operating conditions applicable to the resource, on the operating condition of the application, and generating action data representative of at least one action determined threshold likely to be able to address the pattern of effect.

According to one or more embodiments, a computer-implemented method is provided, wherein the method comprises determining, by a device comprising a processor a first operating condition of a CAMS resource. In another embodiment, the method can further comprise identifying an effect of the first operating condition of the CAMS resource on an operational health of an application determined based on a defined operational health metric, wherein the application is mapped to the CAMS resource. In a further embodiment, the method can further comprise identifying that the operational health of the application has been compromised by the first operating condition of the CAMS resource. In a further embodiment, the method can further comprise generating a first notification indicating that the operational health of the application has been compromised. In a further embodiment, the method can further comprise determining a second operating condition of the CAMS resource and identifying an effect of the second operating condition of the CAMS resource on the operational health of the application determined based on the defined operational health metric. In a further embodiment, the method can comprise identifying that the second operating condition of the CAMS resource causes the operational health of the application to change to a state corresponding to acceptable performance of the application, resulting in an updated operational health and generating a second notification indicating that the updated operational health of the application is in an acceptable condition.

Further embodiments can include a computer program product stored on a non-transitory computer-readable medium and comprising machine-executable instructions, wherein when executed, the machine-executable instructions cause a machine to perform operations, comprising identifying a first operating condition of a CAMS resource in a CAMS cluster. In another embodiment, the operations can further comprise determining the CAMS resource is utilized by an application deployed via the CAMS cluster. In another embodiment, the operations can further comprise determining an effect of the first operating condition of the CAMS resource on a second operating condition of the application. In a further embodiment, the operations can further comprise transmitting a notification, wherein the notification comprises information regarding the second operating condition of the application. In another embodiment, the notification can comprise action data representative of an action determined to be able to at least mitigate an effect of the first operating condition of the CAMS resource on the second operating condition of the application.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 is a system 300 presenting an events table for an application with various events mapped to various health issues, resources pertaining to the events, and a current status of the respective resources, in accordance with one or more embodiments described herein.

DETAILED DESCRIPTION

Figure 1:
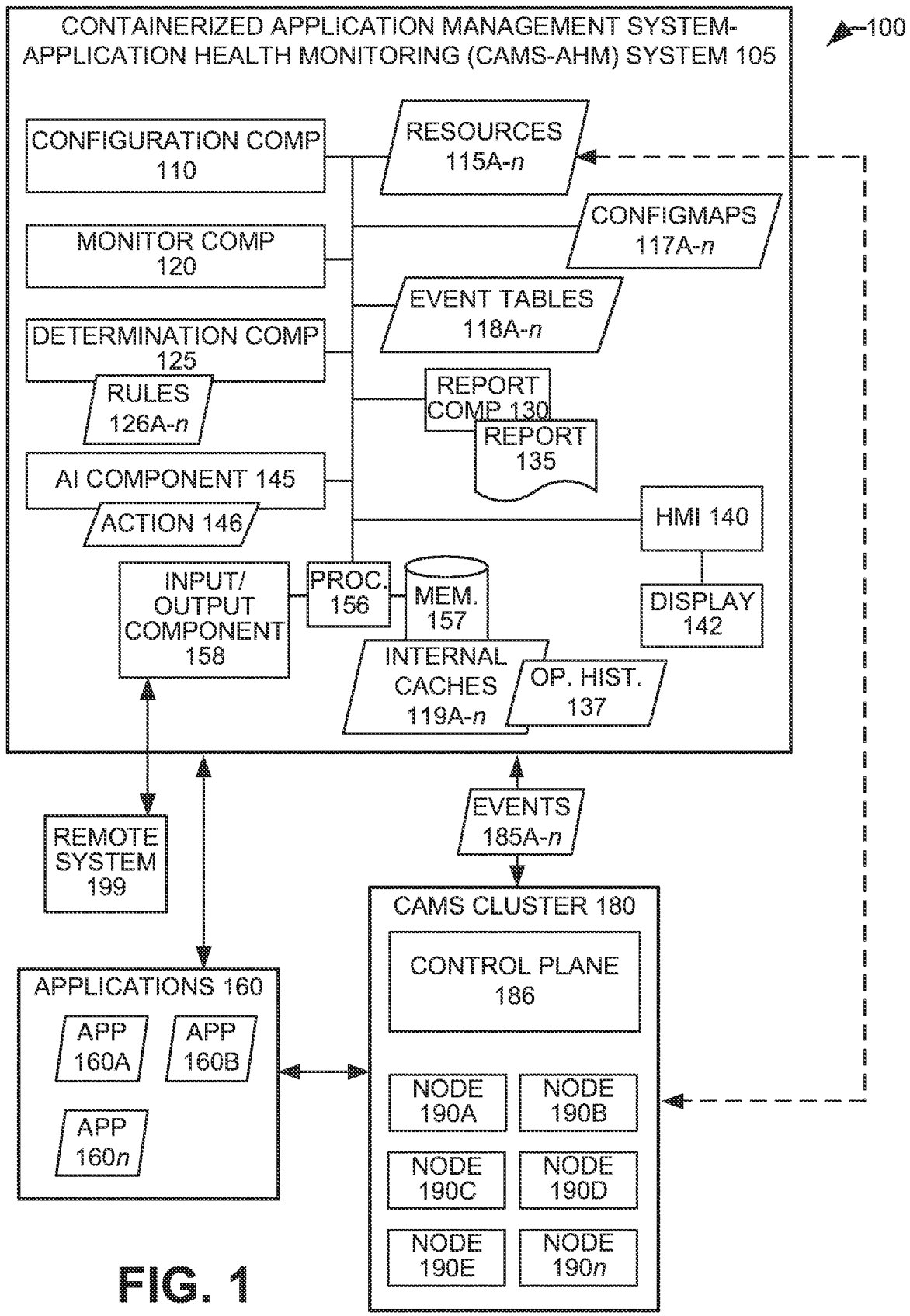
FIG. 1 is a diagram illustrating components configured to monitor and respond to various events on a CAMS cluster as they affect operation of one or more applications deployed on the CAMS cluster, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

As mentioned, an application can be deployed on a containerized application management system (CAMS) infrastructure, e.g., a CAMS cluster comprising nodes, pods, etc. While the containerized system is referred to herein as a CAMS, such systems can also be referred to as a container orchestration system; a container deployment, scaling and management system; a containerized application, an automated container management system, and the like. The various systems can be highly automated, such that during deployment and operation of an application on a CAMS, minimal human interaction with the CAMS is required. The various systems can be closed-source, proprietary software, as well as open-source software. Such systems and associated components available in the marketplace include AWS FARGATE®, AZURE CONTAINER INSTANCES®, GOOGLE CLOUD RUN®, KUBERNETES®, GOOGLE KUBERNETES ENGINE®, AMAZON ELASTIC KUBERNETES SERVICE®, AZURE KUBERNETES SERVICE®, OPEN SHIFT CONTAINER PLATFORM®, RANCHER®, DOCKER®, DOCKER SWARM®, NOMAD®, etc.

A CAMS has numerous built-in tools available to determine and report the operational health of a CAMS infrastructure. A CAMS can include an event application programming interface (API) as part of its infrastructure, comprising various event types which can be related to the operational health of the CAMS infrastructure, as well as other functionality. While the event types are of use at the CAMS infrastructure level, they are not always sufficient for monitoring and/or managing operating conditions of enterprise applications deployed on a CAMS cluster. Events on a CAMS cluster are relatively short-lived, e.g., are guaranteed to exist for only two hours, which may not be enough time for an administrator to identify them in a busy CAMS cluster. Also, these events provide an unfiltered look at the CAMS cluster operating condition. While events may be helpful for troubleshooting operation of the CAMS cluster, the sheer volume of information can be too verbose for monitoring an enterprise application. For example, operator overload/fatigue can readily occur if a notification is presented to the administrator (e.g., end user, customer, client, operator, and the like) every time each resource undergoes a change in operating condition, e.g., fails. While a CAMS can automatically recover from the resource failure, it would be operationally useful to notify an administrator when the operating condition of an application is jeopardized, or at risk, as a result of a resource failing.

Currently available tools do not provide a method(s) to report a list of the events that are application centric and, further, do not provide a method(s) to filter events to pinpoint the exact operational issue affecting an application, and how it may be corrected. The currently available tools are not configured to monitor and/or report on the operational performance of an application and how it is impacted by an operational state of a node in the CAMS cluster. For example, what is the operational effect on an application when, in a non-limiting list, (a) a node fails, (b) a node is temporarily off-line during a reboot, (c) memory capacity at a node has become limited, (d) a CPU at a node is becoming operationally strained due to demands placed on the node by one or more applications utilizing the node, and the like. In an example scenario, while an operational state of a node has changed from a first operational state (e.g., Normal operation) to a second operational state (e.g., non-Normal operation), the second operational state may be such that it has no, or minor, impact on the operational state of an application, and a client does not need to be overly concerned about the second operational state (e.g., a node failure) as their application is still running and able to tolerate any effect(s) of the second operational state. However, in another example scenario, the second operational state results in, or may result in, catastrophic failure of the application, loss of data, etc., and the client should be notified of the failure, or possibility of failure, as soon as possible.

The subject disclosure, and various embodiments presented herein, generally relates to monitoring operational performance (aka, operational state, operational health, operating condition) of one or more applications deployed and/or operating on a CAMS cluster as a function of resource failure (e.g., at a node) upon the one or more applications.

In various embodiments, a CAMS-application health monitoring (CAMS-AHM) system is presented herein, wherein, the CAMS-AHM system can be configured (mapped) to establish associations between various operational states of various resources and various operational states of one or more applications, determine a resource has changed its operational state (e.g., a node has failed which has a disk drive assigned to the application), determine the consequence of the change in operational state of the resource on the operational health of the application (e.g., based upon the previously defined associations of resource operational state and application operational state), and can further make a determination on whether the operational state of the resource and its impact on the operational health of the application should be reported (e.g., generate a notification), and can further determine what subsequent action to perform and/or generate recommended action, and the like. For example, in an example scenario, if the impact of the current operational state of the resource on the application is negligible then a client does not need to be notified. However, in another example scenario, if the impact of the current operational state of the resource on the application is, or has potential to be, significant/catastrophic, then the client should be notified so that, either (a) the client can implement one or more actions to address the current operational state, or (b) the CAMS-AHM identifies (e.g., automatically) one or more actions to address the current operational state to recommend the client implements or the CAMS-AHM automatically initiates implementation of the one or more actions.

Terminology: Various Terms Used Herein, Include

CAMS Architecture: any component, system, device, etc., utilized by, or incorporated into a CAMS cluster, including a node, a pod, a container, a compute machine (virtual and/or physical), a containerized application, a storage device, a service device, and the like.

Application: any software program that can be deployed on a CAMS cluster and/or utilize a CAMS cluster.

Application Component: any component, device, etc., included in the CAMS architecture to be utilized by the Application. For example, a storage device, disk drive, a CPU, etc.

Cluster: a set of nodes (worker machines) that run a containerized application. A cluster has at least one node.

Control plane: The collection of processes that control CAMS nodes.

Namespace: A virtual cluster, wherein a namespace provides a mechanism for isolating groups of resources within a single cluster. Namespaces allow a CAMS to manage multiple clusters (for multiple teams or projects) within the same physical cluster.

Nodes: These machines perform the requested tasks assigned by the control plane.

Pod: A set of one or more containers deployed to a single node. A pod is the smallest and simplest CAMS object.

Resource: utilized to manage the CAMS architecture, e.g., the correct number and correct type of pods are being utilized for the deployed application. Resources include REPLICASET, DEPLOYMENT, STATEFULSETS, PODS, JOB, CRONJOB, CUSTOM RESOURCE DEFINITIONS (CRDS), DAEMONSETS resources, and such like. Hence, while examples (e.g., resources, code, and such like) recite resources listed here, the examples are non-limiting, and the embodiments are no so restricted with code similar to that presented herein is equally applicable while configured for a different CAMS. For example, different resources and resource names may be utilized in different CAMS applicable to the various embodiments presented herein.

Service: A way to expose an application running on a set of pods as a network service. This decouples work definitions from the pods.

Volume: A directory containing data, accessible to the containers in a pod. A CAMS volume has the same lifetime as the pod that encloses it. A volume outlives any containers that run within the pod, and data is preserved when a container restarts.

It is to be appreciated that the various embodiments presented herein can be implemented automatically by one or more components and/or systems configured to perform the one or more operations, functions, etc., e.g., by one or more components included in the CAMS-AHM system. Automated operations can include, for example, associating an operating condition of an application resource with an effect on an operating condition of an application, determining an operational condition of an application resource, determining an effect of an operational condition of an application resource on an application, determining whether a notification is required owing to the operating condition of an application, determining an action to take to address an effect of an operating condition of an application, recommending an action to take to address an effect on an operating condition of an application, implementing an action to take to address an effect on an operating condition of an application, and the like.

As used herein, n is any positive integer.

Turning to the figures, FIG. 1 presents a system 100 comprising various components configured to monitor and respond to various events on a CAMS cluster as they affect operation of one or more applications deployed on the CAMS cluster, in accordance with one or more embodiments described herein.

In an embodiment, a CAMS-AHM system 105 is configured to monitor operation of one or more applications 160A-n deployed on a CAMS cluster 180, wherein the CAMS cluster 180 comprises a plurality of nodes 190A-n. As further described, as an event 185A-n occurs at a node 190A-n in the CAMS cluster 180, the CAMS-AHM system 105 can be configured to determine an effect of the event 185A-n on the operational health of the one or more applications 160A-n and, based thereon, generate a notification, generate a report, determine and recommend an action, implement an action, and the like. In an embodiment, an event 185A-n can be generated as a function of a resource 115A-n changing from a first operational state (e.g., a Normal operational state) to a second operational state (e.g., a non-Normal operational state).

The CAMS cluster 180 can comprise architecture configured and communicatively coupled to create the CAMS cluster 180, e.g., nodes (nodes 190A-n), pods, etc. However, it is to be noted that while for the purpose of brevity of this description, the CAMS cluster and the events occurring thereon, is presented at an architecture level comprising nodes 190A-n, the CAMS cluster 180 can include any of the previously mentioned architecture, components, and resources forming the CAMS cluster 180, and further, while the description herein focuses on nodes 190A-n, the various embodiments presented herein apply equally to any of the components and resources forming a CAMS cluster 180. Further, the CAMS cluster 180 can be located in a single datacenter, distributed across multiple datacenters, located in the "cloud" (e.g., a cloud-based analytics system, a cloud computing-based resource, and the like), an edge computing system, and the like.

As shown in FIG. 1, the CAMS-AHM system 105 can include a processor 156 and a memory 157, wherein the processor 156 can execute the various computer-executable components, functions, operations, etc., presented herein. The memory 157 can be utilized to store the various computer-executable components, functions, code, etc., as well as information regarding resources 115A-n, configmaps (e.g., configmaps 117A-n, as further described, also known as configuration tables), event tables (e.g., event tables 118A-n, as further described), internal caches (e.g., internal caches 119A-n, as further described), and the like. As further shown, the CAMS-AHM system 105 can include an input/output (I/O) component 158 configured to enable transmission of information (e.g., reports, instructions, data, and the like) between the CAMS-AHM system 105, the CAMS cluster 180, events (e.g., events 185A-n) at nodes 190A-n, information pertaining to the applications 160A-n deployed on the CAMS cluster 180, to a remote system 199, and the like.

In an embodiment, the CAMS-AHM system 105 can further include a human-machine interface 140 (HMI) which can be configured to present various information regarding the operational health of an application 160A-n, status of a resource 115A-n, etc. The HMI 140 can include an interactive display 142 to present the various information via various screens presented thereon.

In an embodiment, the CAMS-AHM system 105 can include a configuration component 110, which, as further described, can be utilized to map (associate) the one or more applications 160A-n with various resources 115A-n and their respective operation on nodes 190A-n. During creation of an application 160A-n, resources 115A-n can be identified with regard to which resource types (e.g., REPLICASET, DEPLOYMENT, STATEFULSETS, PODS, JOB, CRONJOB, CUSTOM RESOURCE DEFINITIONS (CRDs), DAEMONSETS resources, and such like) are to be utilized during the deployment and operation of the application 160A-n on the CAMS cluster 180. In an embodiment, the respective nodes 190A-n can be considered to be physical resources, while the resources 115A-n can be considered to be logical resources associated with the nodes 190A-n in the CAMS cluster 180. A resource (e.g., resource 115A) associated with a particular node (e.g., node 190A) can be shared between more than one applications that are utilizing the node, e.g., the resource can be utilized by a first application (e.g., application 160A/APP1) and by a second application (e.g., application 160B/APP2). In an embodiment, the various resources 115A-n can be registered with the CAMS-AHM system 105 using an annotation that enables the CAMS-AHM system 105 to monitor one or more operational states of the resources 115A-n, wherein monitoring can be conducted by the monitor component 120. Example code of an example annotation is presented below in EXAMPLE CODE 1, wherein application resources DEPLOYMENT, REPLICASET, and POD are registered:

```
apiVersion: app.k8s.io/v1beta1
kind: Application
metadata:
    annotations:
        com.dellemc.kahm.subscribed: "true"
    labels:
        app.kubernetes.io/instance: app1
        app.kubernetes.io/name: app1
    name: app1
    namespace: svc-objectscale-v1-domain-c10
spec:
    assemblyPhase: Succeeded
    componentKinds:
        - group: apps
          kind: Deployment
        - group: apps
          kind: ReplicaSet
        - group: core
          kind: Pod
```

-continued

```
    - group: csi-baremetal.dell.com
      kind: Drive
  descriptor:
        description: Dell EMC Comment
  Kubernetes Services
    keywords:
      - app1
    type: decks
    version: 2.1.0-1757
  selector:
    matchLabels:
        app.kubernetes.io/name: app1
```

Figure 2:
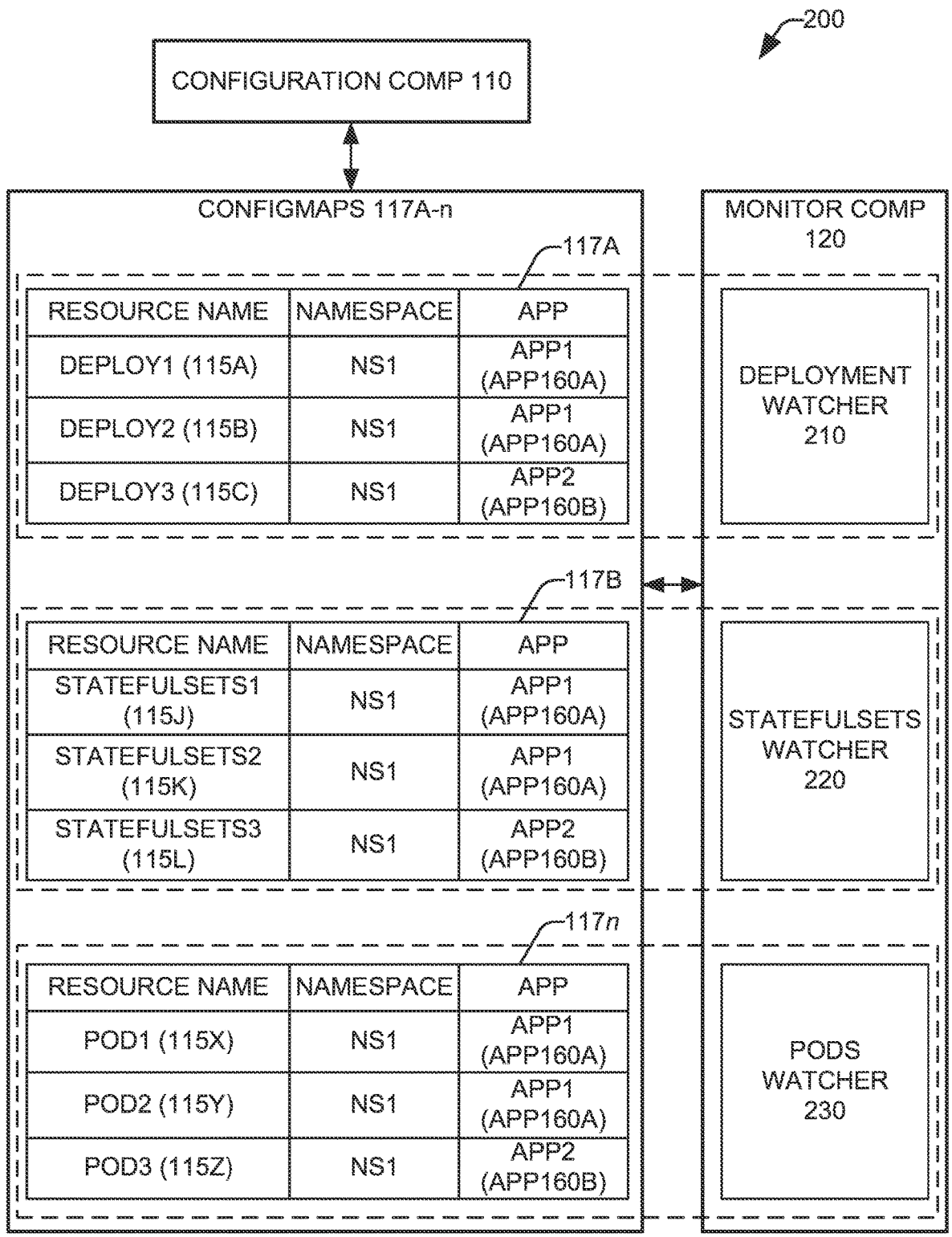
FIG. 2 is a diagram illustrating components utilized to map various CAMS resources with various applications and subsequently monitor the CAMS resources, in accordance with one or more embodiments described herein.

Example Code 1: Annotation Code to Register Application Resources with the CAMS-AHM System Reviewing FIG. 1 in conjunction with FIG. 2, FIG. 2 presents system 200 comprising the configuration component 110 and the monitor component 120 with an example of various ConfigMaps 117A-n representing respective resources 115A-n being mapped to a particular application 160A-n. Various ConfigMaps 117A-n can be generated during the mapping of the one or more applications 160A-n to the various resources 115A-n operating on the respective nodes 190A-n. ConfigMaps 117A-n can be generated using any suitable technology/format, for example, the Config-Maps 117A-n can be application programming interface (API) objects. In an embodiment, during creating and deploying an application 160A-n, a matching selecto r label(s) can be defined for the resource(s) 115A-n that maps to respective applications 160A-n, (e.g., with reference to FIG. 2, labels APP1, APP2, and suchlike) thus ensuring that all the resources 115A-n pertaining to a particular application (e.g., any of applications 160A-n) are labelled with the same selector label.

In the examples shown in FIG. 2, ConfigMap 117A maps various DEPLOYMENT resources to the respective applications for Namespace N1, wherein, DEPLOY1 (115A) is mapped to APP1 (application 160A), DEPLOY2 (115B) is mapped to APP 1, and DEPLOY3 (115C) is mapped to APP2 (application 160B). ConfigMap 117B maps various STATE-FULSETS resources to the respective applications for Namespace N1, wherein, STATEFULSETS1 (115J) is mapped to APP1, STATEFULSETS2 (115K) is mapped to APP 1, and STATEFULSETS3 (115L) is mapped to APP2. Further, ConfigMap 117n maps various PODS resources to the respective applications for Namespace N1, wherein, POD1 (115X) is mapped to APP1, POD2 (115Y) is mapped to APP 1, and POD3 (115Z) is mapped to APP2.

The monitoring component 120 can be configured to monitor the respective resources 115A-n for various events 185A-n regarding the operational condition of the resources 115A-n. As shown in FIG. 2, the monitor component 120 can include various watcher components configured to monitor respective resources, wherein DEPLOYMENT WATCHER 210 is configured to monitor operational states of DEPLOY1, DEPLOY2, and DEPLOY3 (and corresponding events), STATEFULSETS WATCHER 220 is configured to monitor respective operational states of STATEFUL-SETS1, STATEFULSETS2, and STATEFULSETS3 (and corresponding events), and PODS WATCHER 230 is configured to monitor respective operational states of POD1, POD2, and POD3 (and corresponding events). In an embodiment, the monitoring component 120 can be configured with various thresholds, metrics, etc., for utilization in determining an operating condition of a resource 115A-n, an operating condition of an application 160A-n, etc. Accordingly, the monitoring component 120 can be configured to determine when an operating condition has changed based upon a threshold of operation being crossed, a magnitude in change of operation shifting, etc.

In an embodiment, each of the ConfigMaps 117A-n can have an internal cache(s) 118A-n associated therewith (e.g., located in memory 157), such that as the CAMS-AHM system 105 monitors the operational health of the applications 160A-n, the resources 115A-n defined for the application 160A-n, etc., information generated during the monitoring of the operational health can be stored in the internal cache for the respective applications 160A-n and/or config-maps 117A-n. In an embodiment, storing the ConfigMaps 117A-n at the internal cache enables the CAMS-AHM system 105 to identify which resources 115A-n belongs to which application 160A-n and match the incoming events 185A-n to a respective application 160A-n.

In a further embodiment, an operational history 137 of the respective applications 160A-n can be generated (e.g., based upon any of the resources 115A-n, ConfigMaps 117A-n, event tables 118A-n, etc.) wherein the operational history 137 can be stored at the internal caches 119A-n for subsequent review by an administrator and/or analysis by a component configured to review operation of the applications 160A-n, e.g., by an artificial intelligence (AI) component 145.

As previously mentioned, various events 185A-n (also known as "issue statuses") can occur during implementation of an application 160A-n on a CAMS cluster 180. In an embodiment, the prospective events 185A-n and the effect of their occurrence, referred to herein as "health issues", can be configured in event tables 118A-n. e.g., in conjunction with the ConfigMaps 117A-n. For example, with the various resources being assigned to one or more applications, a change in state of a resource can be identified for the application, and further, an event can be generated indicating what application component(s) is affected, and accordingly, what is the effect of the change in state of the application resource upon the operation of the application component(s) and the operational health of the application. In an embodiment, the events 185A-n can be generated by a control plane component 186 configured to control operation of the CAMS cluster 180.

FIG. 3 presents an example event table 118A for an application (e.g., application 160A) and various events 185A-n mapped to various health issues 310, physical resources 360A-n pertaining to the events 185A-n, and a current status 380A-n of the respective physical resources 360A-n. A severity 330A-n can be applied to an event 185A-n, for example, based upon an effect of an operating condition upon the operational health of an application 160A-n. Severity can be based upon a metric, a threshold being met and/or crossed, etc.

In the example presented in FIG. 3, the events 185A-n and health issues 310A-n pertain to disk issues 310A regarding operational state of a disk drive storage device 360A, and its current status 380A (e.g., as defined for the operation of application 160A). As shown, an event E1 (185A) is configured with a severity 330A of WARNING, a message/notification 340A (if deemed necessary to generate) of DISK FAILURE IS SUSPECTED, with a reason 350A of DISKSUSPECT; an event E2 (185B) is configured with a severity 330B of ERROR, a message 340B of DISK IS FAILED, and a reason 350B of DISKFAILED; an event E3 (185C) is configured with a severity 330C of NORMAL, a message 340C of DISK IS REPLACED, and a reason 350C of DISKREPLACEMENT, and an event E4 (185D) is configured with a severity 330D of NORMAL, a message 340D of DISK OPERATIONAL, and a reason 350D of NORMALFUNCTION. The events 185A-D were mapped to resource DISK 1 360A, which has a current operational state 380A of NORMAL.

While not shown in FIG. 3, the resources presented in FIG. 2 (e.g., DEPLOY, STATEFULSETS, POD, etc.,) can be mapped to the events presented in FIG. 3. Hence, when a change in state of the STATEFULSETS2 resource is determined, owing to the mapping, the STATEFULSETS2 is associated with the DISKSUSPECT 350A event. Similarly, all of the various resources 115A-n can be mapped to respective events 185A-n.

As shown in FIG. 3, various events in the events 185A-n can be related to one-another, and multiple events 185A-n may belong to the same health issue (e.g., disk issue 310A) but have a different severity 330A-n respectively indicating a current state of the respective health issue 310A-n. As further shown in FIG. 3, multiple fields and parameters can be used in combination to indicate when events 185A-n are to be grouped as the same health issue 310A-n, and when an event should remain distinct.

In an embodiment, a status 380A-n of a health issue 310A-n can be considered "cleared" when the operating condition of an application resource 115A-n, transitions from any non-Normal state (e.g., an event 185A-n is in an event state) to a Normal state (e.g., an event 185A-n is in a non-event state), and the health issue 310A-n can be removed from active list of health issue 310A-n concerns. For example, per FIG. 3, the events 185A-D can transition from E4(185D)→E1(185A)→E2(185B)→E3(185C)→E4 (185D), wherein at event E4 (185D) the disk 360A is in a normal state 330D of operation, with a reason of DISK OPERATIONAL (340D) and reason NORMALFUNCTION (350D) available to be reported. Subsequently, a change in operational state of the disk 360A is detected, with event E1(185A) being detected, wherein the disk 360A is suspected to be undergoing a failure, accordingly, a WARNING (330A) can be generated with a message of DISK FAILURE IS SUSPECTED (340A) along with a reason code DISKSUSPECT 350A. The disk 360A ultimately fails, with a further change in operational state of the disk 360A being detected, with event E2 (185B) being detected, wherein the disk 360A is determined to have failed, accordingly, an ERROR (330B) can be generated with a message of DISK IS FAILED (340B) along with a reason code DISKFAILED 350B. The disk 360A is subsequently replaced and returns to a normal operational state, with a further change in operational state of the disk 360A being detected, event E3 (185C) is detected, wherein the disk 360A is determined to have been replaced, accordingly, a severity of NORMAL (330C) can be generated with a message of DISK IS REPLACED (340C) along with a reason code DISKREPLACEMENT 350C. The status of the disk 360A can remain with the event E3 (185C), in an embodiment, the status of the disk issue 310A can transition back to event E4 (185D) wherein the disk 360A is in a normal state 330D of operation, with a reason of DISK OPERATIONAL (340D) and reason NORMALFUNCTION (350D) available to be reported.

In an embodiment, the various fields, labels, and parameters presented in FIG. 3 for respective events 185A-n can have various filtering rules (e.g., rules 126A-n) applied thereto, to determine whether an event 185A-n is to be presented to an entity concerned with the operational health of applications 160A-n. EXAMPLE CODE 2, below, presents an example of event, in events 185A-n, being received with a label "SymptomID:25000" or "SymptomID:250001", and a health issue "disk issue" (e.g., disk issue 310A) being opened in response to a determination that the severity type for this event for this particular application is non-Normal (e.g., events E1/185A and E2/185B, per FIG. 3). In an embodiment, all the events 185A-n with the same label can be grouped together under the same health issue 310A-n so that an entity can review the current open health issue (e.g., disk issue 310A) and the list of events (e.g., events E1/185A-E4/185D) occurring for that health issue.

```
apiVersion: V1
data:
   eventRules: I-
      issueRules:
         - description: "disk issue"
           name: "diskfail"
           matchOnList:
                 - matchon:
                       - label: SymptomID
                         value: 25000
                 - matchon:
                       - label: SymptomID
                         value: 25001
              notifiers:
                 - objectscale-snmp-notifier
         rules:
              - description: send all critical events to SNMP server
           matchon:
                 - field: type
                   operator: "=="
                   value: Critical
           notifiers:
                 - objectscale-snmp-notifier
kind: ConfigMap
metadata:
      creationTimestamp: null
      name: app1-app-config
      annotations:
         com.dellemc.kahm.subscribed: "true"
```

Example Code 2: ConfigMap Code Defining a Rule(s) for Filtering of Events Pertaining to an Application In an embodiment, the health issues 310A-n can be cleared (e.g., automatically) based upon transmission of an event 185A-n having a severity 330A-n of NORMAL (e.g., either of events E3/185C or E4/185D with respective severity of NORMAL 330C or 330D). In another embodiment, the health issues 310A-n can be cleared (e.g., automatically) based upon a timeout based clear. For example, the CAMS architecture has a guarantee of being operationally repaired within 2 hours, hence, once a time period of 2 hours has expired since an event 185A-n was detected (e.g., E4/185D transitions to E1/185A), the health issue 310A-n can be cleared. In a further embodiment, if the health issue is not cleared automatically, the CAMS-AHM system 105 can provide an option (e.g., via a screen on HMI 140/display 142, per FIG. 1) to an administrator of the respective application 160A-n to clear the health issue manually, e.g., using a REST API input.

Returning to FIG. 1, in an embodiment, the CAMS-AHM system 105 can further include a determination component 125, which can be utilized to review one or more events 185A-n received at the CAMS-AHM system 105, and whether the event is to be reported. The determination component 125 can be configured to apply one or more rules 126A-n to information available in the resources 115A-n, ConfigMaps 117A-n, event tables 118A-n, etc. In an embodiment, the rules 126A-n can be applied based upon a severity 330A-n of an event 185A-n, a type of resource 115A-n being processed, a device (e.g., disk 360A), etc., to enable limitation of information presented (e.g., in table 410, FIG. 4) to an administrator, such that only information of use to the administrator in monitoring the application(s) is presented. In an embodiment, when an event 185A-n is received at the CAMS-AHM system 105, the determination component 125 can extract the resource 115A-n from the event (e.g., in events 185A-n), review the ConfigMaps 117A-n for any occurrence of the resource and associate the occurrence with settings in the event tables 118A-n. As shown in FIG. 3, the various events can be configured to be reported/filtered, e.g., event E1/185A can be configured to not be reported (per report YES/NO setting 390), while events E2/185B, E3/185C, and E4/185D are to be reported (per report YES/NO setting 390). In response to determining that an event is to be reported, a report component 130 can be utilized to generate a report 135 including the notification, wherein the report 135 can be generated by any suitable technology such as by transmission of an email, transfer of a notification for display in a screen presented on display 142, or remotely (e.g., to remote system 199), etc. Such suitable technologies include SNMP (simple network management protocol), SMTP (simple mail transfer protocol), ESE (extensible storage engine), GRPC (gRPC remote procedure calls), and the like. Upon receipt of the notification, the administrator of the application 160A-n can act upon the notification as required, e.g., with a notification that a disk drive is performing in a non-Normal manner, the administrator can review operation of the disk drive, replace the disk drive, etc. As a result of the CAMS-AHM system 105 storing the operational history (e.g., operational history 137) of the resources 115A-n defined for an application 160A-n, along with any identified events 118A-n, the administrator can review the operating history of the application(s) 160A-n and make recommendations based thereon regarding maximizing/maintaining the operational health of the application(s) 160A-n. Hence, unlike a CAMS system configured to simply monitor operation of various components comprising a CAMS cluster (e.g., CAMS cluster 180), the CAMS-AHM system 105 can attach an application context to an event, whereby an administrator can be kept informed of the operational health of one or more applications 160A-n deployed on the CAMS system.

In another embodiment, determination component 125 can be configured to apply various artificial intelligence technologies (e.g., in conjunction with artificial intelligence (AI) component 145) to any of the information generated or gathered by the CAMS-AHM system 105 defined information, operating information (e.g., defined in ConfigMaps 117A-n, in the event table). The determination component can review the operational history 137 stored at the CAMS-AHM system 105 to identify one or more responses to information provided to an administrator, e.g., based upon whether the administrator followed up on the event. Accordingly, the determination component 125 can provide feedback regarding how useful a particular notification is (e.g., in report 135).

As further shown, the CAMS-AHM system 105 can further include an artificial intelligence (AI) component 145. In an embodiment, the AI component 145 can be configured to monitor operation of the applications 160A-n, the CAMS cluster 180, nodes 190A-n, events 185A-n, etc., to identify any patterns of operation that might affect an operating condition of the one or more applications 160A-n. For example, the AI component 145 can be configured to provide pre-emptive functionality to prevent an adverse operating condition of the applications 160A-n from occurring. The AI component 145 can review a history (e.g., operational history 137) of why and/or when various events 185A-n were generated (e.g., as stored in the ConfigMap cache 119A-n) and determine a pattern of event occurrence in the event history. For example, the AI component 145 identifies that one or more nodes temporarily go offline on a periodic basis. The AI component 145 can generate a history report (e.g., AI action report 146) identifying the periodicity of offline condition, which the administrator of the CAMS-AHM system 105 can then investigate further to determine the cause of the periodic change in operation of the nodes. The AI component 145 can further review prior methods of addressing the effects of an event 185A-n, and based thereon, can generate a recommendation/action data (e.g., in AI action report 146) on how to address a currently occurring event. In an embodiment, during training of the AI component 145, training data can be utilized to establish one or more thresholds, actions, metrics, and the like, that were utilized during a prior resolution of an effect of a pattern, operational condition, etc. In generating a recommendation, the AI component 145 can be configured to utilize the various thresholds, actions, metrics, and the like, to qualify/quantify an effect of one or more recommendations to address/mitigate a potential effect on an operational health of the one or more applications. Hence, where a number of recommendations exist for presentment, the recommendations can be listed in order of potential effective.

Figure 4:
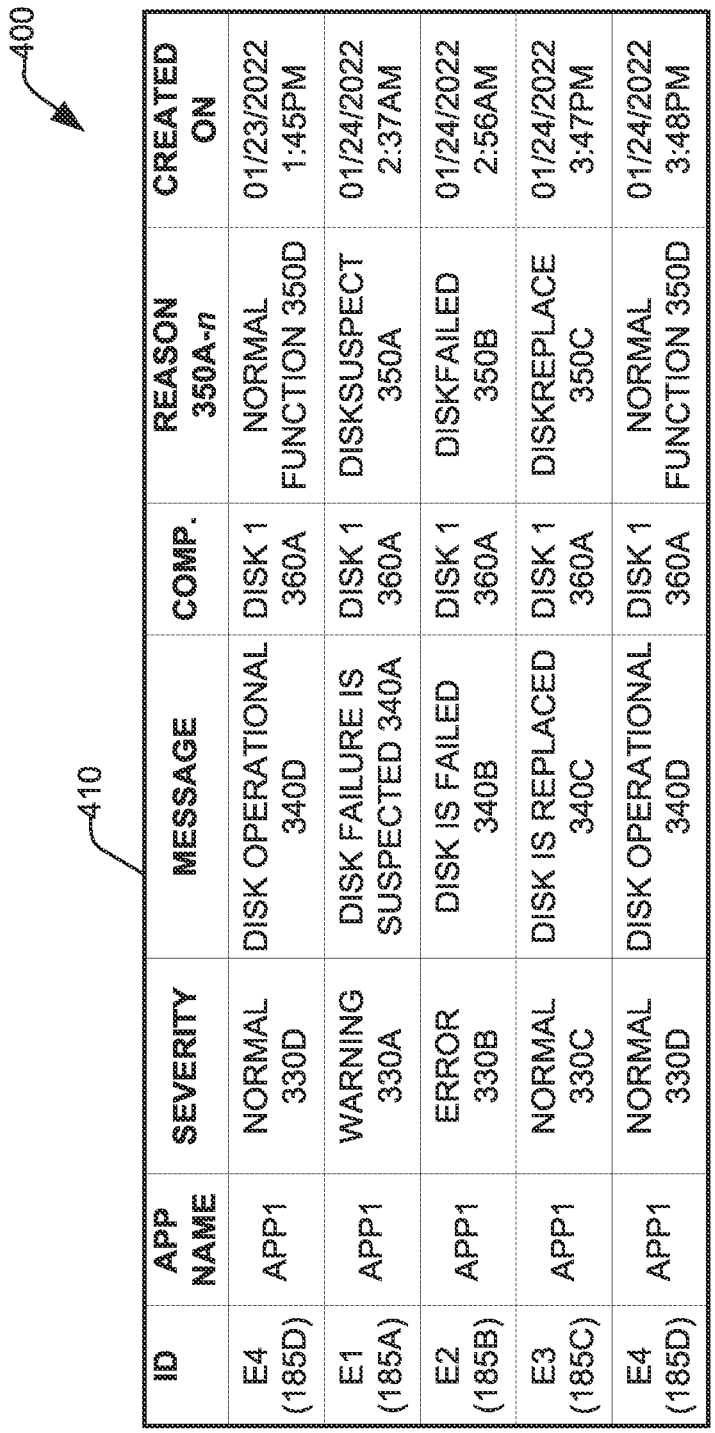
FIG. 4 is a system 400 presents an example operational health screen generated as a function of events occurring and affecting operation of an application, in accordance with one or more embodiments described herein.

FIG. 4, system 400, presents an example operational health screen generated as a function of events occurring and affecting operation of an application, in accordance with one or more embodiments described herein.

In the example presented, the notifications pertain to the operational health of APP1 (per the example configurations presented in FIG. 3), wherein the various notifications can be presented in an operational health table 410 which can be presented on display 142, or on a remotely located display as a function of the notifications being transmitted to a remotely located system via report 135 utilizing I/O component 158. As shown in FIG. 4, and previously mentioned with reference to FIG. 3, when monitoring of APP1 is initiated (e.g., at 1-23-2022, 1:45 PM) DISK 1 (360A) is functioning normally. Subsequently a change in operational state is detected at 2:37 AM, 1-24-2022 with a WARNING (330A) being generated and presented on the operational health table 410 and a message DISK FAILURE IS SUSPECTED (340A). At 2:56 AM, 1-24-2022 DISK 1 is determined to have failed, with an ERROR (330B) being generated and presented on the operational health table 410 and a message DISK IS FAILED (340B). In response to the failure of DISK 1, DISK 1 is replaced, normal operation is determined, with a severity of NORMAL (330C) being presented in the operational health table 410 and a message DISK IS REPLACED (340C). Subsequently, at 1-24-2022, 3:48 PM, DISK 1 is determined to be operating normally with a message DISK OPERATIONAL (340D) presented. Hence, rather than the wealth of information that could be presented based upon operational changes in the various resources 115A-n on CAMS cluster 180, wherein the information does not readily pertain to operation of the applications 160A-n, with the information presented in the operational health table 410, an administrator can readily view a current operational state of an application in conjunction with an operating history of various devices, components, etc., utilized by the application. It is to be appreciated that while information is only presented for one application (e.g., APP1) and one resource (e.g., DISK 1), the operational health table 410 can present information pertaining to multiple applications and multiple resources.

Figure 5:
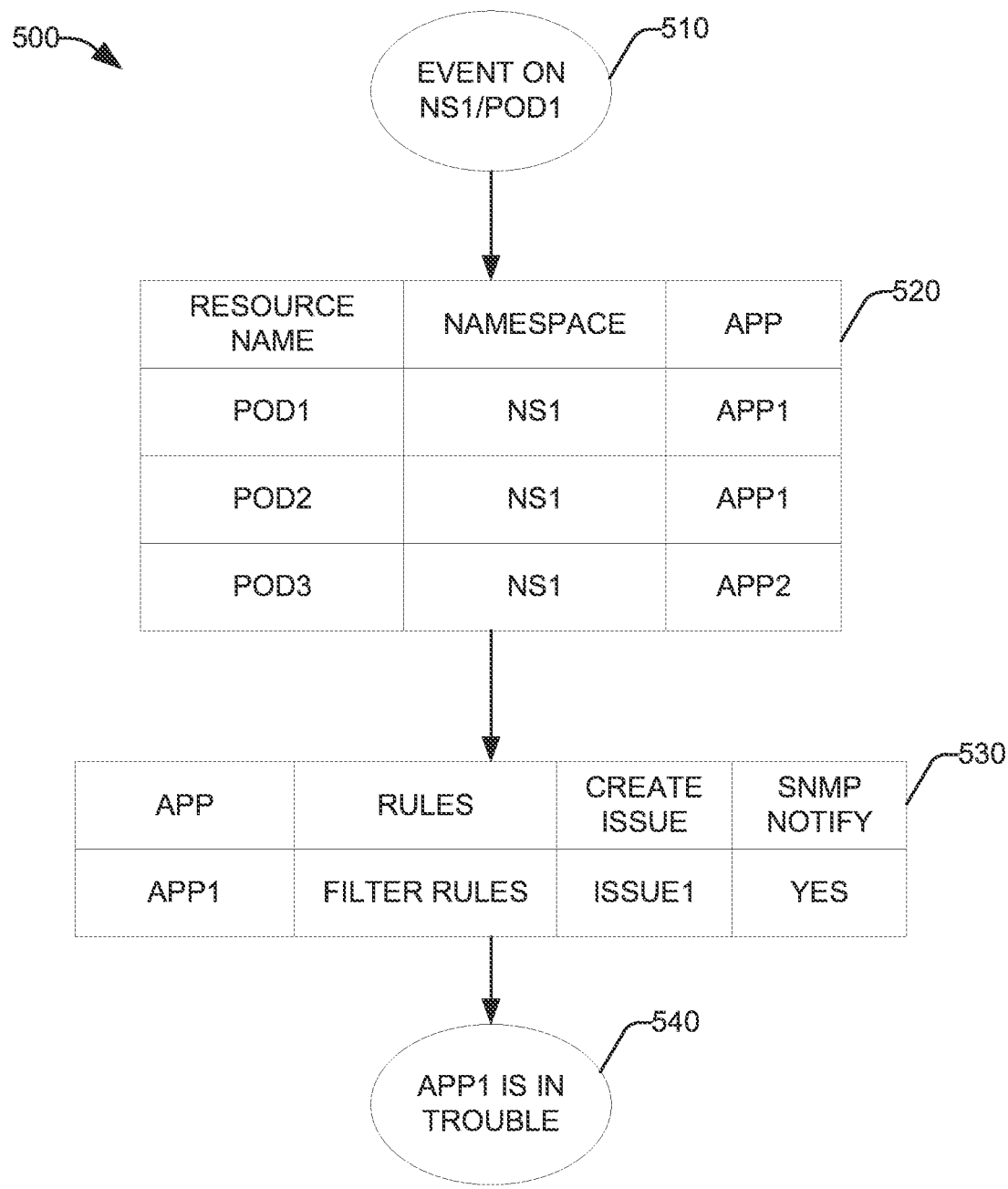
FIG. 5, system 500, provides a visual representation of an event occurring in a CAMS system with an affected application being identified, in accordance with one or more embodiments described herein.

FIG. 5, system 500, provides a visual representation of the various previously presented concepts, in accordance with one or more embodiments described herein. As shown at 510, an event (e.g., event(s) 185A-n) is occurring and detected at a namespace NS1/POD1 (e.g., by monitoring component 120). The Config Table 520 can be accessed (e.g., by the determination component 125) to determine which application (e.g., application(s) 160A-n) has the potential to have its operational health affected by the event at NS1/POD1. As shown, POD1 in NS1 (resource(s) 115A-n) has been previously configured (e.g., by configuration component 110 in ConfigMap(s) 117A-n) to be being utilized by APP1. At 530, the event at APP1 (e.g., the disk issue 310A per FIG. 3) can be reviewed to determine whether the event is to be reported. As shown, a notification (e.g., in report 135) is to be generated, wherein the notification can be transmitted via SNMP, for example. At 540, the notification is transmitted indicating that the operating condition of APP1 is potentially being affected by the event on NS1/POD1.

Figure 6:
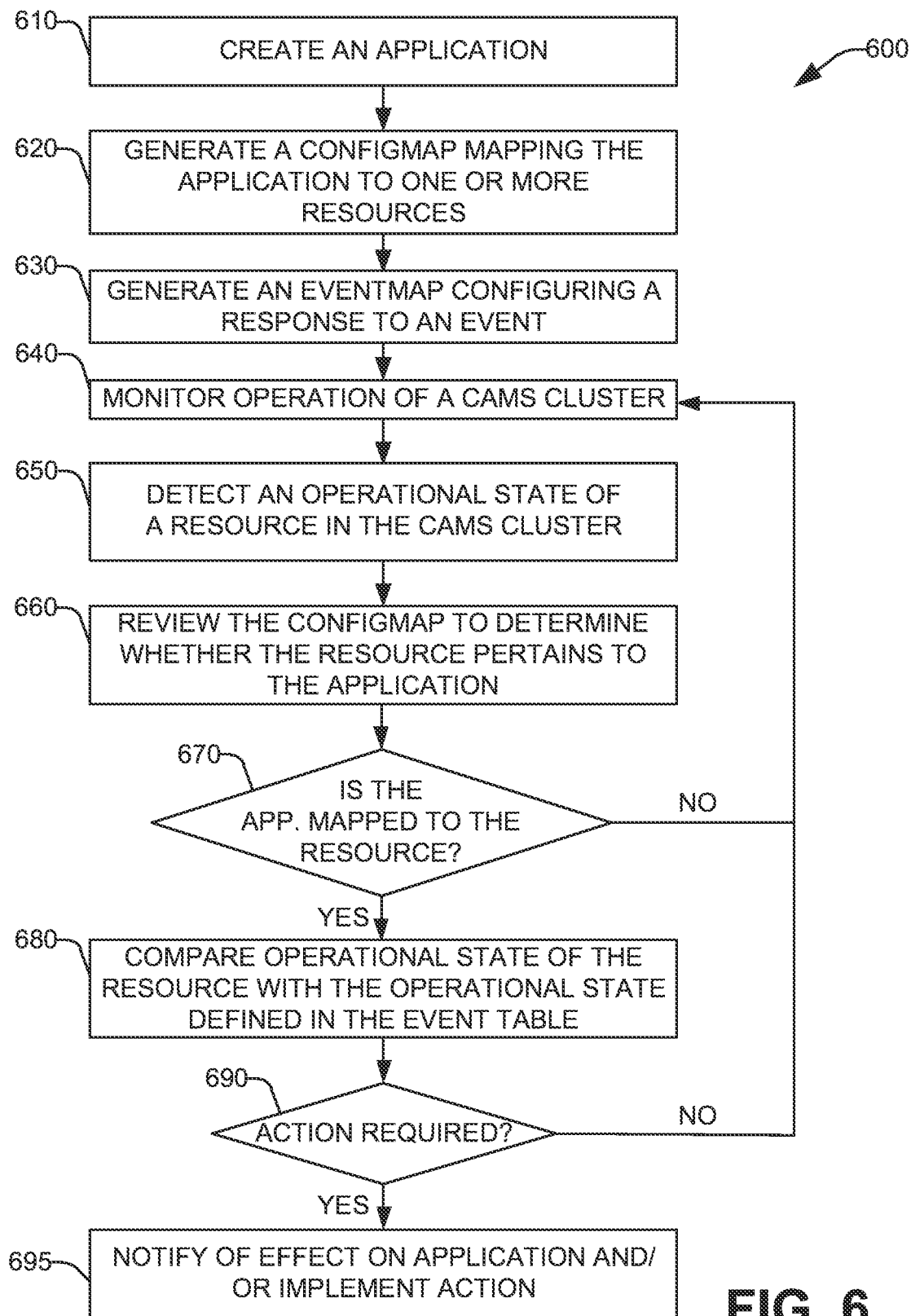
FIG. 6 is a flow diagram of a non-limiting computer implemented method for monitoring an operating condition of one or more applications deployed on a CAMS cluster, in accordance with one or more embodiments described herein.

FIG. 6 illustrates methodology 600 for monitoring an operating condition of one or more applications deployed on a CAMS cluster, in accordance with one or more embodiments described herein.

At 610, an application (e.g., application(s) 160A-n) is created, wherein the application is to be deployed on a CAMS infrastructure (e.g., CAMS cluster 180). As part of the creation, various resources (e.g., resources 115A-n) operating in the CAMS cluster are identified.

At 620, a system (e.g., CAMS-AHM system 105) can be configured to monitor operation of the application as it is deployed and operating on the CAMS cluster. As part of configuring the system, various ConfigMaps (e.g., ConfigMaps 117A-n) are created wherein the ConfigMaps associate each resource to one or more events (e.g., events 185A-n).

At 630, an event table (e.g., event table(s) 118A-n) can be configured for each resource (e.g., resources 115A-n) associated with an application. The event tables can include a configuration (e.g., a report YES/NO setting 390) to enable various filtering rules to be applied to each event to enable a filtering operation(s) to be applied. The filtering operation(s) can be configured to control whether a notification is generated for an event or not. The filtering can be based upon any suitable parameter such as severity, or potential severity, timing, etc., of an event upon the operational health of the application.

At 640, operation of the CAMS cluster is monitored (e.g., by monitoring component 120)

At 650, an operational state of a resource can be detected, e.g., an operational state of an application resource transitions from a "Normal" condition to a "Non-normal" condition.

At 660, the ConfigMap can be reviewed (e.g., by determination component 125) to determine whether the resource is of concern for the operational health of the application.

At 670, a determination can be made as to whether the resource is of concern to the application. In response to a determination that NO the resource is not of interest to the operational health of the application, the methodology 600 can return to 640, wherein the operation of the CAMS cluster can be further monitored.

At 670, in response to a determination that YES the resource is of interest to the operational health of the application (e.g., the resource appears in the ConfigMap defined for the application), methodology 600 can advance to 670.

At 680, the event generated for the resource can be compared with an event status defined in the event map.

At 690, based upon the results of identifying the event info, a determination can be made as to whether a further action is to be initiated to address the effects of the event. In response to a determination that NO further action is required, the methodology 600 can return to 640, wherein operation of the CAMS cluster can be further monitored.

At 690, in response to a determination of YES, further action is required, methodology 600 can advance to 695. Depending upon the various configurations defined in the ConfigMap, any number of actions can be undertaken, wherein the actions can include generating a notification, recommending an action to address a potential effect of the event(s), etc.

Figure 7:
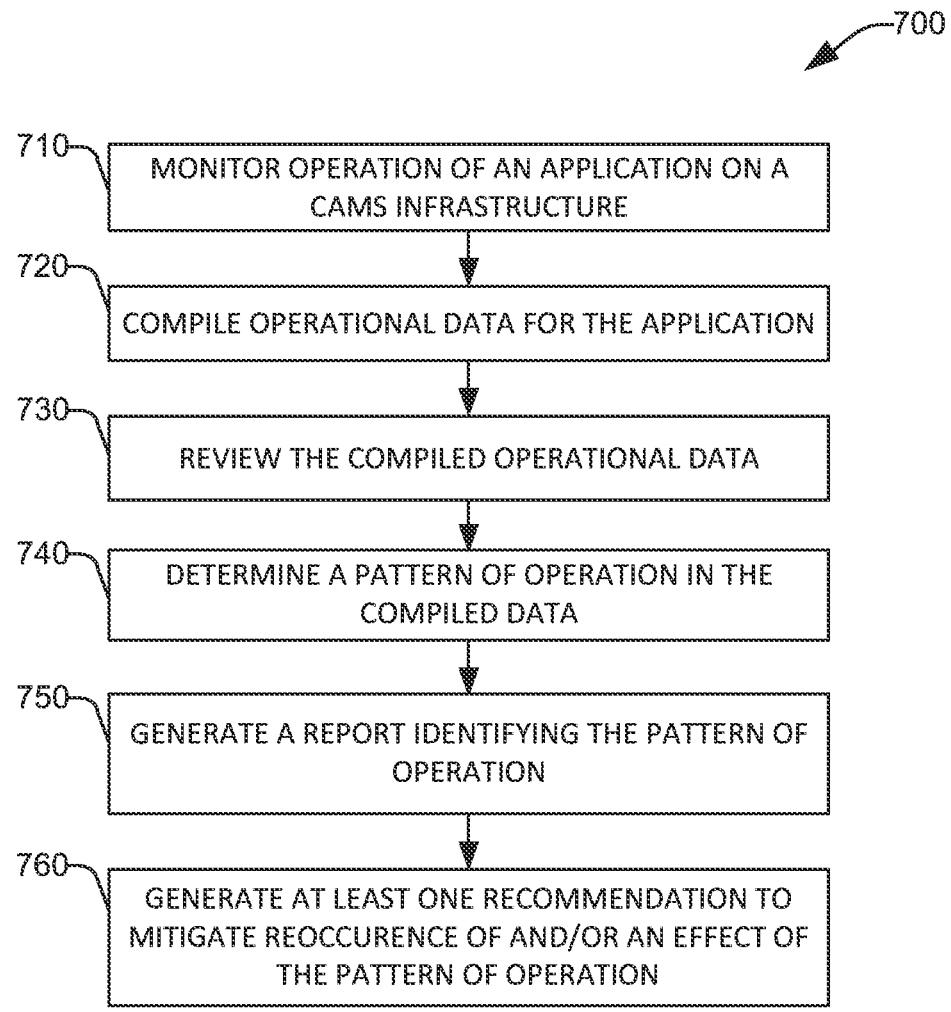
FIG. 7 is a flow diagram of a non-limiting computer implemented method for preemptively addressing various issues that can arise during operation of an application deployed on a CAMS infrastructure, in accordance with one or more embodiments described herein.

FIG. 7 illustrates methodology 700 for preemptively addressing various issues that can arise during operation of an application deployed on a CAMS infrastructure, in accordance with one or more embodiments described herein.

At 710, a CAMS-AHM system (e.g., system 105) can be configured to monitor operation of one or more applications (e.g., applications 160A-n) deployed on a CAMS infrastructure (e.g., CAMS cluster 180). The CAMS-AHM system can also monitor an operating condition of one or more resources (e.g., 115A-n) wherein the resources have been mapped to the one or more applications, such that if an operating condition of a resource changes from a first operating condition to a second operating condition, the effect of the first operating condition and the effect of the second operating condition on the operational health of the one or more applications can be assessed.

At 720, data collected during the monitoring of the one or more applications is cached (e.g., in cache 119A-n), wherein the operating condition(s) of the one or more resources, and the effect of the operating condition(s) of the one or more resources upon the operational health of the one or more applications can also be cached. The cached data can be compiled to form an operational history of the one or more applications, one or more resources, etc.

At 730, the cached data can be reviewed. The cached data can be reviewed by an AI component (e.g., AI component 145). As a function of implementing the AI component, the AI component can be previously trained with data pertaining to operational condition of any of application resources, applications, CAMS architecture, and the like. Accordingly, the AI component can be utilized to determine patterns in operational data of the resources, the applications, etc. In an embodiment, during training of the AI component, the training data can be utilized to establish one or more thresholds, actions, metrics, and the like, that were utilized during a prior resolution of an effect of a pattern, operational condition, etc.

At 740, the AI component can be utilized to determine patterns, anomalies, etc., in the operational history compiled for the one or more applications, one or more resources, etc. In an embodiment, the pattern can be determined based upon the training data utilized to train the AI component. In another embodiment, the pattern can be based upon various mathematical formulae, algorithms, and the like, where patterns such as deviation from a mean, average, etc. can be detected.

At 750, in response to detecting a pattern, anomaly, etc., the AI component can be configured to generate a report (e.g., report 135) identifying the determined pattern, etc. The report can be generated by the AI component in conjunction with a report component (e.g., report component 130).

At 760, the AI component can be further configured to generate one or more recommendations/action data (e.g., in AI action 146) to address/mitigate the patterns and their potential effect upon the future operational health of the one or more applications. For example, a pattern may appear having a repetitive time cycle, whereupon further analysis, the repetitive time cycle results from periodic maintenance of one or more components in the CAMS infrastructure. The AI component can identify the periodic maintenance and recommend a maintenance operation that has potentially less impact on the operational health of the one or more applications. As mentioned with regard to step 730, the AI component can be configured with various thresholds, actions, metrics, and the like, that can be utilized by the AI component to qualify/quantify an effect of one or more recommendations to address/mitigate a potential effect on an operational health of the one or more applications.

Figure 8:
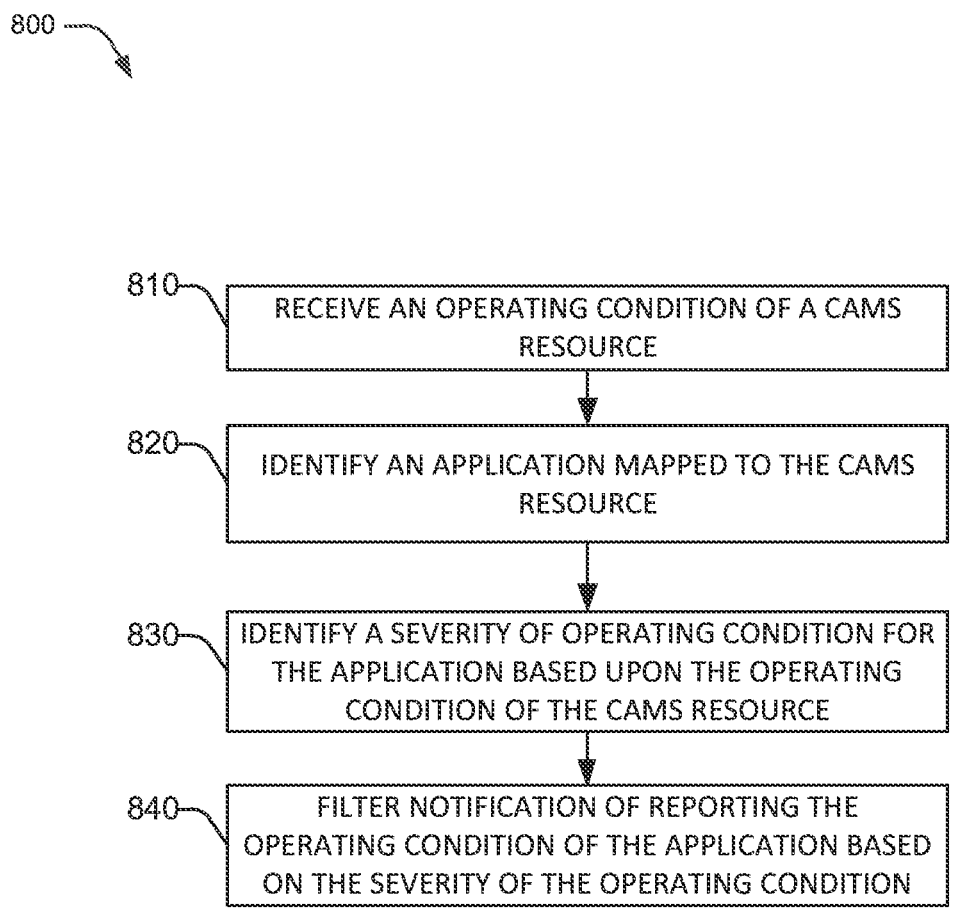
FIG. 8 is a flow diagram of a non-limiting computer implemented method to determine whether to generate a notification regarding an operating condition of an application as a function of a severity applied to an event pertaining to an operating condition of a resource, in accordance with one or more embodiments described herein.

FIG. 8 illustrates methodology 800 to assess a severity of an operating condition of an application as a function of a severity applied to an event pertaining to an operating condition of a resource, in accordance with one or more embodiments described herein.

At 810, an operating condition of a resource (e.g., in resources 115A-n) is received.

At 820, one or more applications (e.g., applications 160A-n) mapped to the resource can be identified, wherein the applications and resources can be mapped in a ConfigMap (e.g., in ConfigMap 117A-n.).

At 830, an event table (e.g., event table(s) 118A-n) can be created which maps the resource to the application, and is further configured to define a severity of impact of an operating condition of the resource upon an operating condition of the application, e.g., for a particular component (e.g., DISK 1 (360A)).

At 840, rather than notifying an administrator monitoring operation of the one or more applications of every instance of an event occurring one the CAMS infrastructure, a filtering operation can be utilized whereby only the notifications of actual concern to the administrator are generated (e.g., based on rules 126A-n). For example, each operating condition of a resource that has an operational effect on the one or more applications are configured in the event table, such as operating condition of the resource equates to "Normal" operation of the application, operating condition of the resource equates to being potentially damaging to the operation of the application and a "Warning" is generated for the application, operating condition of the resource equates to being damaging to the operation of the application and an "Error" is generated for the application (per examples presented in FIGS. 2, 3, and 4).

Example Applications and Use

Figure 9:
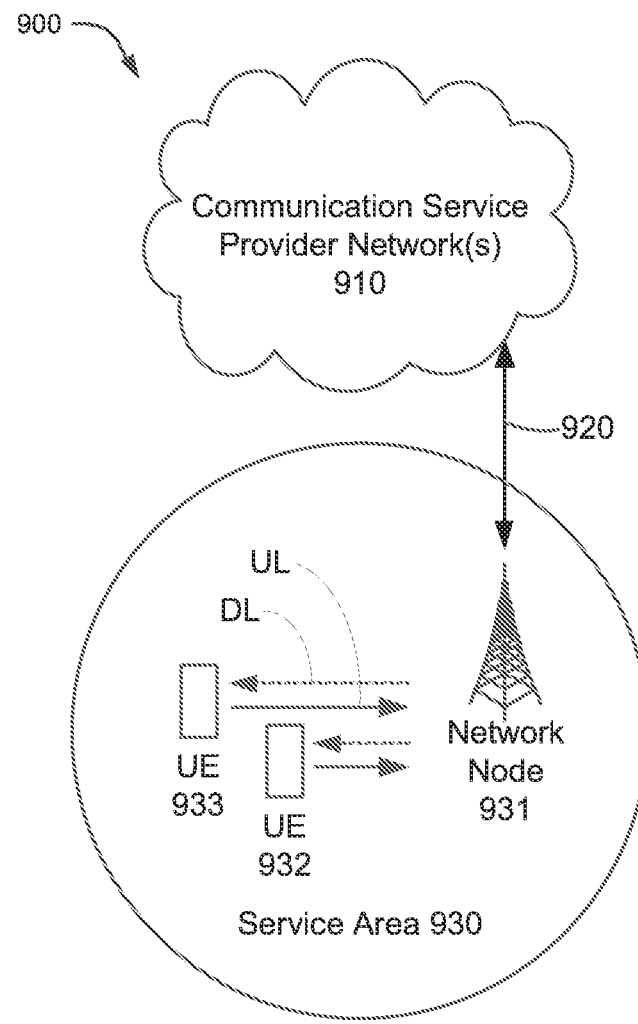
FIG. 9 illustrates an example wireless communication system, in accordance with one or more embodiments described herein.

FIG. 9 illustrates an example wireless communication system 900, in accordance with one or more embodiments described herein. The example wireless communication system 900 comprises communication service provider network(s) 910, a network node 931, and user equipment (UEs) 932, 933. A backhaul link 920 connects the communication service provider network(s) 910 and the network node 931. The network node 931 can communicate with UEs 932, 933 within its service area 930. The dashed arrow lines from the network node 931 to the UEs 932, 933 represent downlink (DL) communications to the UEs 932, 933. The solid arrow lines from the UEs 932, 933 to the network node 931 represent uplink (UL) communications.

In general, with reference to FIG. 9, the non-limiting term "user equipment" can refer to any type of device that can communicate with network node 931 in a cellular or mobile communication system 900. UEs 932, 933 can have one or more antenna panels having vertical and horizontal elements. Examples of UEs 932, 933 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 932, 933 can also comprise IOT devices that communicate wirelessly.

In various embodiments, system 900 comprises communication service provider network(s) 910 serviced by one or more wireless communication network providers. Communication service provider network(s) 910 can comprise a "core network". In example embodiments, UEs 932, 933 can be communicatively coupled to the communication service provider network(s) 910 via a network node 931. The network node 931 can communicate with UEs 932, 933, thus providing connectivity between the UEs 932, 933 and the wider cellular network. The UEs 932, 933 can send transmission type recommendation data to the network node 931. The transmission type recommendation data can comprise a recommendation to transmit data via a closed loop multiple input multiple output (MIMO) mode and/or a rank-1 precoder mode.

Network node 931 can have a cabinet and other protected enclosures, computing devices, an antenna mast, and multiple antennas for performing various transmission operations (e.g., MIMO operations) and for directing/steering signal beams. Network node 931 can comprise one or more base station devices which implement features of the network node. Network nodes can serve several cells, depending on the configuration and type of antenna. In example embodiments, UEs 932, 933 can send and/or receive communication data via wireless links to the network node 931.

Communication service provider networks 910 can facilitate providing wireless communication services to UEs 932, 933 via the network node 931 and/or various additional network devices (not shown) included in the one or more communication service provider networks 910. The one or more communication service provider networks 910 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 900 can be or comprise a large-scale wireless communication network that spans various geographic areas. According to this implementation, the one or more communication service provider networks 910 can be or comprise the wireless communication network and/or various additional devices and components of the wireless communication network (e.g., additional network devices and cell, additional UEs, network server devices, etc.).

The network node 931 can be connected to the one or more communication service provider networks 910 via one or more backhaul links 920. The one or more backhaul links 920 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 920 can also comprise wireless link components, such as but not limited to, line-of-sight (LOS) or non-LOS links which can comprise terrestrial air-interfaces or deep space links (e.g., satellite communication links for navigation). Backhaul links 920 can be implemented via a "transport network" in some embodiments. In another embodiment, network node 931 can be part of an integrated access and backhaul network. This may allow easier deployment of a dense network of self-backhauled 5G cells in a more integrated manner by building upon many of the control and data channels/procedures defined for providing access to UEs 932, 933.

Wireless communication system 900 can employ various cellular systems, technologies, and modulation modes to facilitate wireless radio communications between devices (e.g., the UEs 932, 933 and the network node 931). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 900 can operate in accordance with any 5G, next generation communication technology, or existing communication technologies, various examples of which are listed supra. In this regard, various features and functionalities of system 900 are applicable where the devices (e.g., the UEs 932, 933 and the network node 931) of system 900 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 900 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHZ) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 10:
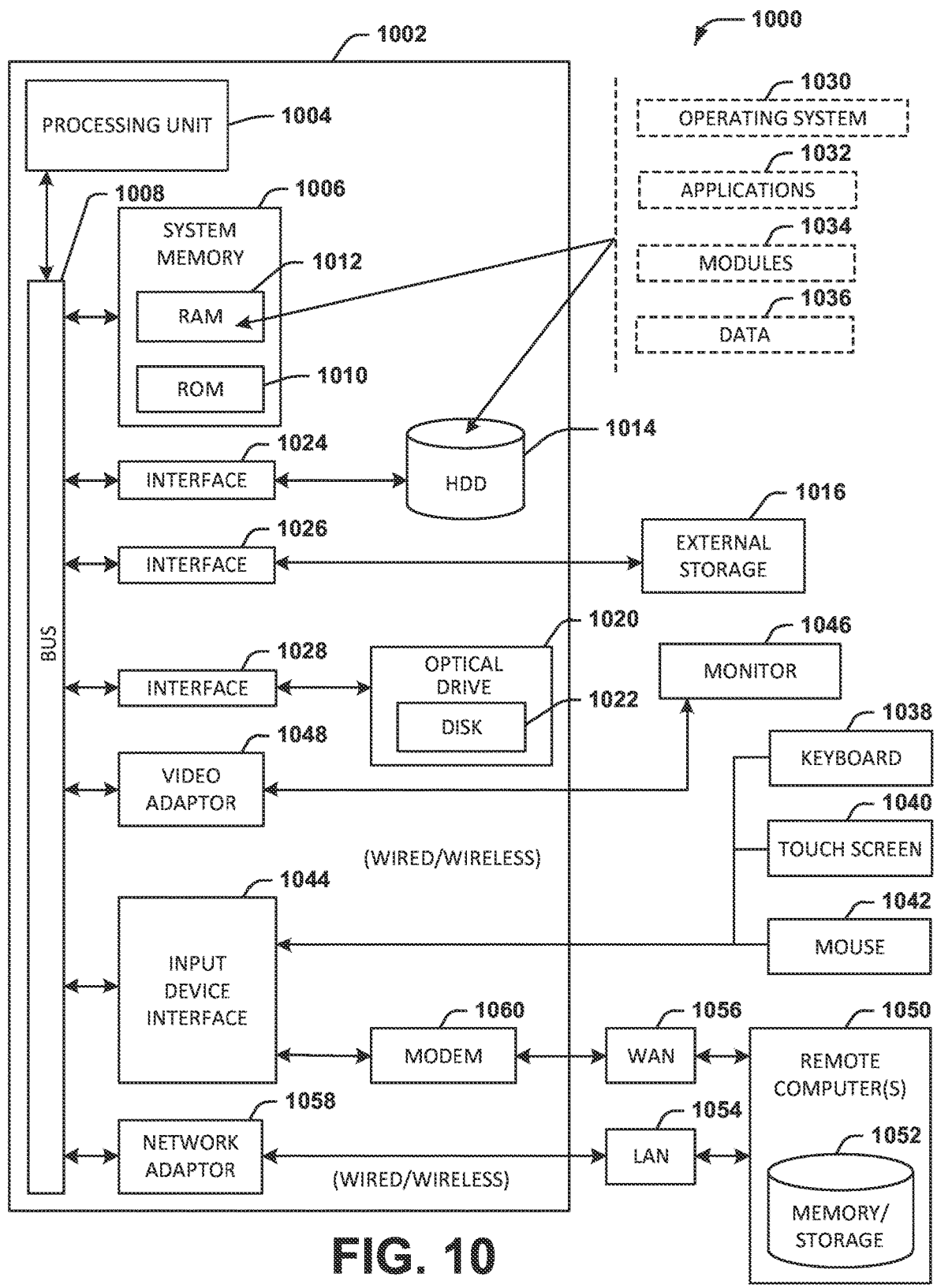
FIG. 10 illustrates a block diagram of an example computer operable to execute one or more embodiments presented herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
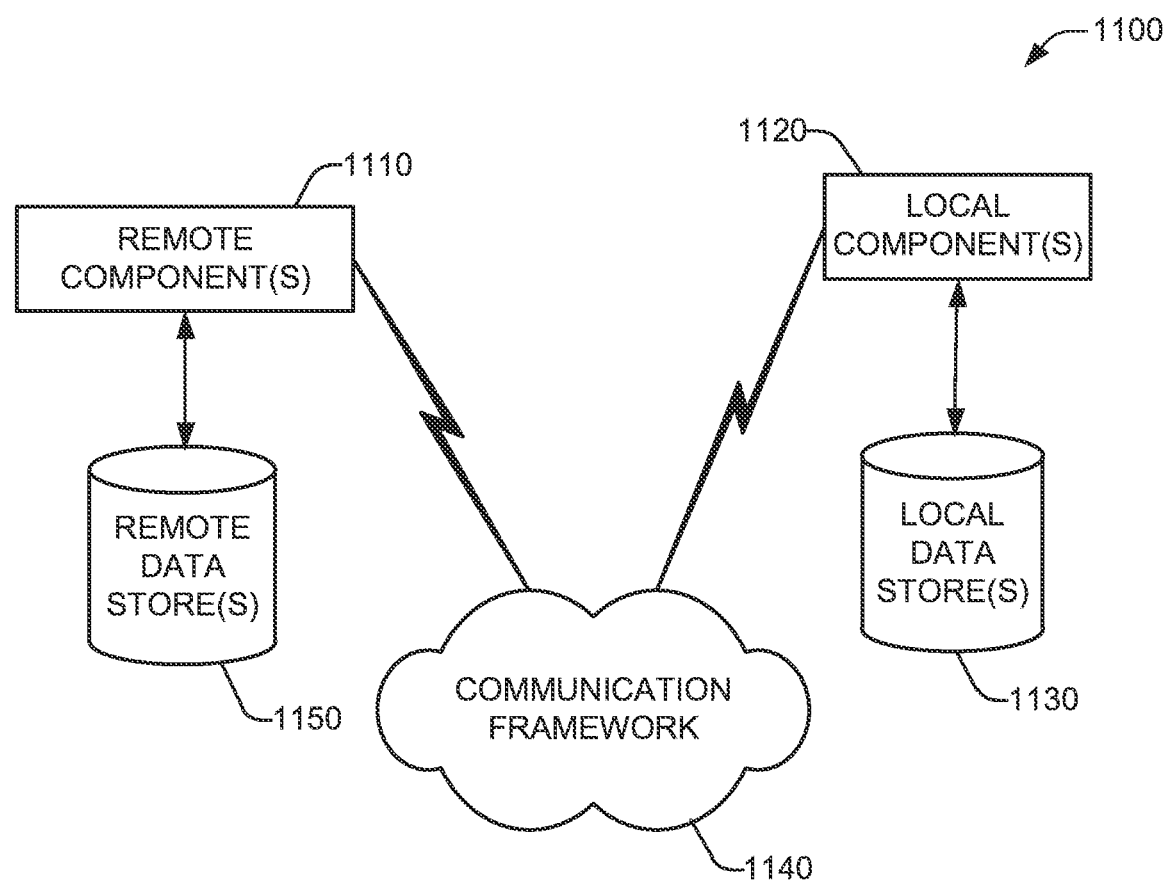
FIG. 11 is a block diagram representing an example computing environment into which aspects of the subject matter described herein may be incorporated.

Referring now to details of one or more elements illustrated at FIG. 11, an illustrative cloud computing environment 1100 is depicted. FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client 195 entity," "consumer," "client 195 entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claims is:

1. A system, comprising:
at least one processor; and
at least one memory that stores executable instructions that, when executed by the at least one processor, facilitate performance of operations, comprising:
defining a configuration map, wherein the configuration map is configured to map an operating condition of a resource to a set of respective operational health metrics for a set of applications that includes at least two applications, wherein the resource is included in a deployment of a containerized application management system (CAMS), and wherein a first application in the set of applications is executing via the CAMS and a second application in the set of applications is executing via the CAMS;

determining a change in an operating condition of the resource;

identifying, via the configuration map, that the resource is being utilized by the first application;

identifying the change in the operating condition of the resource;

comparing the change in the operating condition of the resource with the set of operational health metrics defined for the first application, wherein the set of operational health metrics comprises:

a first metric having a first severity indicating that an operational health of the first application has been affected and that a notification is to be communicated regarding the operational health, and a second metric having a second severity indicating an acceptable performance of the first application and that no notification is to be communicated; and responsive to determining, from the set of operational health metrics, that the change in the operating condition of the resource matches the first metric, generating the notification indicating the operational health of the first application has been affected; and communicating the notification to the first application.

2. The system of claim 1, wherein the operations further comprise:

in response to determining, from the set of operational health metrics, that the change in the operating condition of the resource matches the second metric and that no notification is to be communicated, maintaining a current operating condition of the first application at the resource.

3. The system of claim 1, wherein the CAMS comprises at least one of a node or a pod.

4. The system of claim 1, wherein the resource is one of a ReplicaSet, a Deployment, a StatefulSet, a Pod, a Job, a CronJob, a Custom Resource Definition (CRD), or a DaemonSet.

5. The system of claim 1, wherein the resource indicates a third operating condition of a component operating via the deployment of the CAMS.

6. The system of claim 5, wherein the component is one of a storage device configured to store information generated by the first application or a processor configured to execute processor-executable instructions during execution of the first application.

7. The system of claim 1, wherein the identifying that the resource is being utilized by the first application comprises:

mapping the resource to the first application to facilitate the identifying that the resource is being utilized by the first application executing via the CAMS.

8. The system of claim 1, wherein the operations further comprise:

compiling an operational history for the first application, wherein the operational history comprises a collection of operating conditions applicable to the resource and respective effects of the operating conditions of the collection on the operating condition of the first application.

9. The system of claim 8, wherein the operations further comprise:

analyzing the operational history to identify a pattern of effect of at least one operating condition, of the collection of operating conditions applicable to the resource, on the operating condition of the first application; and generating action data representative of at least one action determined threshold likely to be able to address the pattern of effect.

10. The system of claim 1, wherein the change in the operating condition of the resource is a first change to a first operating condition of the resource of the first application at a node of the CAMS, wherein the notification is a first notification, and wherein the operations further comprise:

detecting a second change in the first operating condition of the resource;

determining that the second change in the first operating condition of the resource has a third severity that does not affect a second operating condition of the first application; and generating a second notification indicating the second operating condition of the first application resulting from the change to the first operating condition of the resource of the first application at the node.

11. A method, comprising:

determining, by a device comprising at least one processor, an operating condition of a containerized application management system (CAMS) resource;

identifying, by the device, an effect of the operating condition of the CAMS resource on an operational health of a first application determined based on a group of operational health metrics defined for the first application, wherein the first application is mapped to the CAMS resource via a configuration map comprising respective operational health metrics for a set of applications including at least two applications, wherein the at least two applications comprise the first application and a second application, and the group of operational health metrics comprises:

a first metric having a first severity corresponding to an operational health of the first application having been affected and requiring notification, and a second metric having a second severity corresponding to an acceptable performance of the first application and not requiring any notification;

identifying, by the device, that the operating condition of the CAMS resource has a severity matching the first metric;

generating, by the device, based on the severity matching the first metric, a notification indicating that the operational health of the first application has been compromised; and facilitating, by the device, transmitting the notification to the first application.

12. The method of claim 11, wherein the operating condition of the CAMS resource is a first operating condition of the CAMS resource, wherein the notification is a first notification, and wherein the method further comprises:

determining, by the device, a second operating condition of the CAMS resource;

identifying, by the device, that the second operating condition of the CAMS resource has a severity matching the second metric; and based on the severity matching the second metric, generating a second notification indicating that the operational health of the first application is in an acceptable condition.

13. The method of claim 11, wherein the CAMS resource is at least one of a ReplicaSet, a Deployment, a StatefulSet, a Pod, a Job, a CronJob, a Custom Resource Definition (CRD), or a DaemonSet.

14. The method of claim 11, wherein the notification is a first notification, wherein the operational health of the first application is a first operational health of the first application, and further comprising:
- determining, by the device, an effect of the first operating condition on a second operational health of the second application that is configured to utilize the CAMS resource; and
- generating, by the device, a second notification indicating that the second operational health of the second application is experiencing the effect as a function of the first operating condition of the CAMS resource.

15. A non-transitory machine-readable medium, comprising executable instructions that, when executed by at least one processor, facilitate performance of operations, the operations comprising:
- identifying an operating condition of a containerized application management system (CAMS) resource in a CAMS cluster;
- determining the CAMS resource is utilized by a first application deployed via the CAMS cluster, wherein utilization of the CAMS resource by the first application is defined via a configuration map comprising respective operational health metrics for a set of applications including at least two applications, wherein the at least two applications comprise the first application and a second application, wherein the configuration map is configured to map an operating condition of the CAMS resource to operational health metrics defined for the first application, and wherein the first application is executing via the CAMS;
- identifying an effect of the operating condition of the CAMS resource on an operational health of the first application determined based on the operational health metrics defined for the first application, and the operational health metrics comprise:
  - a first metric having a first severity indicating that an operational health of the first application has been affected and requires notification, and
  - a second metric having a second severity indicating that performance of the first application is acceptable and does not require notification;
- in response to identifying that the operating condition of the CAMS resource has a severity matching the first metric, generating a notification indicating that the operational health of the first application has been compromised;
- transmitting the notification, wherein the notification comprises information regarding the operating condition of the first application; and
- in response to identifying that the operating condition of the CAMS resource has a severity matching the second metric, precluding transmission of a notification that the operational health of the second application has been compromised.

16. The non-transitory machine-readable medium of claim 15, wherein the operating condition of the first application is a first operating condition of the first application, and the operations further comprising:
- determining an effect of the operating condition of the CAMS resource on a second operating condition of the first application, wherein the notification comprises action data representative of an action determined to be able to at least mitigate an effect of the operating condition of the CAMS resource on the second operating condition of the first application.

17. The non-transitory machine-readable medium of claim 15, wherein the notification comprises at least one of first information identifying the CAMS resource or second information identifying the operating condition of the CAMS resource.

18. The non-transitory machine-readable medium of claim 15, wherein the CAMS resource is at least one of a ReplicaSet, a Deployment, a StatefulSet, a Pod, a Job, a CronJob, a Custom Resource Definition (CRD), or a DaemonSet.

19. The non-transitory machine-readable medium of claim 15, wherein the operations further comprise mapping the CAMS resource to the first application resulting in mapping information, and wherein the mapping information facilitates the determining that the CAMS resource is utilized by the first application deployed via the CAMS cluster.

20. The method of claim 11, wherein the CAMS cluster comprises at least one of a node or a pod.

* * * * *